United States Patent [19]

Barker et al.

[11] 4,054,674
[45] Oct. 18, 1977

[54] SEMI-MOIST ANIMAL FOOD

[75] Inventors: David Barker, Melton Mowbray; Ian Edward Burrows, Gaddesby; Keith Buckley, Melton Mowbray, all of England

[73] Assignee: Pedigree Petfoods Limited, Melton Mowbray, England

[21] Appl. No.: 463,425

[22] Filed: Apr. 23, 1974

[30] Foreign Application Priority Data

Apr. 25, 1973 United Kingdom .............. 19703/73

[51] Int. Cl.$^2$ ............................................. A23L 3/34
[52] U.S. Cl. .................................. 426/326; 426/532; 426/657; 426/805
[58] Field of Search ............... 426/151, 212, 371, 373, 426/321, 332, 335, 326, 374, 331, 532, 641, 646, 654, 656, 657, 325, 805, 129, 410; 260/112, 119; 424/177, 532

[56] References Cited

U.S. PATENT DOCUMENTS

| 2,783,221 | 2/1957 | Nitsche | 424/177 |
|---|---|---|---|
| 3,202,514 | 8/1965 | Burgess | 426/805 |
| 3,295,989 | 1/1967 | Matz | 426/151 |
| 3,529,967 | 9/1970 | Riisberg | 426/212 |
| 3,669,689 | 6/1972 | Hoshino | 424/177 |
| 3,736,148 | 5/1973 | Katz | 426/321 |

FOREIGN PATENT DOCUMENTS

| 3,812,728 | 1963 | Japan | 426/212 |
|---|---|---|---|
| 465,009 | 1971 | Japan | 426/212 |
| 1,151,991 | 5/1969 | United Kingdom | |

OTHER PUBLICATIONS

The Chemistry and Technology of Food and Food Products, Second Ed. Jacobs, Interscience N.Y. pp. 870, 872, 2241, 2242.
Hawley-Condensed Chemical Dictionary, Eighth Ed. Van Nortrand Reinhold Co. N.Y. pp. 82, 647.

*Primary Examiner*—Hiram H. Bernstein
*Attorney, Agent, or Firm*—Davis, Hoxie, Faithfull & Hapgood

[57] ABSTRACT

Bacteriologically stable, semi-moist proteinaceous food products, of lower concentration of conventional humectants and consequently higher acceptability to consumers, such as domestic pets, are obtained by including as at least part of the water-soluble humectant content low molecular weight polypeptide materials. Examples of suitable materials are condensed fish solubles and fish or meat autolysates. Especially preferred are compositions including acidified polypeptide sources and which consequently have pH values in the range 3.5 to 5.5 and have water activities in the range 0.85 to 0.95. Minor proportions of conventional humectants such as sugar or polyhydric alcohols can be included. Compositions of pH 5.5 to 7 and water activity 0.75 to 0.85 can also be preferred. Products may include heat-coagulable binders such as gluten or albumen and be formed with subsequent cooking into coherent pieces. Burger type products can also be formed from pasteurized meats without subsequent cooking.

12 Claims, No Drawings

SEMI-MOIST ANIMAL FOOD

The present invention relates to semi-moist food products, that is to say food products containing proteinaceous materials having moisture contents between those of dry foods and those of fresh or canned meats, and usually in the range 15 to 45%, and stabilized against bacterial growth by the inclusion of a sufficient concentration of edible water-soluble substances.

Products of this type are described, for example, in U.S. Pat. Nos. 2,801,173 and 3,202,514, and the water-soluble substances typically employed are sugars and/or polyhydric alcohols.

Many of the problems with formulating a successful semi-moist pet food are associated with finding a suitable humectant system. This is especially true of cats, which are very sensitive to high levels of conventional humectants and bacteriological stabilizers such as sucrose, propylene glycol or glycerol.

We have now found that by using low molecular weight, polypeptide material in place of high levels of such conventional humectants, not only a stable product but one that is highly attractive to household pets can be produced.

Accordingly the present invention provides a food product comprising edible proteniaceous material and having a moisture content of 15–45%, the product being stabilized against bacterial growth by edible water-soluble substances characterized in that such water-soluble substances include low molecular weight, polypeptide material. The water activity ($A_w$) of the product preferably lies in the range 0.75 – 0.95, depending on the pH of the product.

Sources of low molecular weight polypeptide material, for example fish solubles or fish or meat autolysates, are often acidic or stabilized by the addition of acid. The use of such acidic materials also lowers the pH of the semi-moist product and helps to stabilize it. The protein content of the product may be meat, fish or poultry, including offals and meat by-products, single cell proteins or vegetable proteins.

The polypeptide material should be of sufficiently low molecular weight to be capable of causing a significant reduction in the vapour pressure of water in which it is dissolved and thus in the water activity ($A_w$) of products containing it. As a guide in the selection of useful materials, it may be stated that the preferred polypeptide materials are such as, when an aqueous solution thereof is concentrated to 50% solids, show a water activity of the solution of less than 0.95.

Preferred sources of such low molecular weight polypeptide materials are autolysates of protein materials such as fish or meat, and also fish solubles. In the case of autolysates, the material to be autolysed may be acidified to a pH below 4.5 before autolysis to prevent growth of pathogenic bacteria and in some cases to increases the autolysis rate. If the protein material is autolysed without prior acidification, however, as may be done at elevated temperature for periods of up to, for example, 2 hours, the autolysate may need to be acidified to a similar value to preserve it and to prevent the growth of pathogenic organisms. For the same reason fish solubles are stabilized by the addition of acid, although commercial samples may not have a pH as low as 4.5.

Fish solubles is a by-product of the fish meal industry. When fish is cooked and the protein coagulated, much of the water and oil runs off and can be removed by pressing. The liquor is normally centrifuged to remove the oil. The remaining liquor is known as stickwater and contains dissolved and suspended solids which can amount to about 9% by weight. The stickwater is evaporated to about 30–50% solids by weight acidified and this is known as condensed fish solubles. Sulphuric acid is the usual acidulant, and is added at the level of 1.0 – 2.0%. However if fish solubles are used at the levels suggested with sulphuric acid as the acidulant, the sulphate ion has a purgative effect, and a consequent lowering of the long term acceptance of the product. It is therefore preferred to use fish solubles acidified with a known alternative acid, such as phosphoric acid.

Another way of making a soluble fish polypeptide product is by autolysis. For example, whole fish or fish head and backbone rejects from filleting, can be finely minced and mixed with enough food grade acid to reduce the pH to about 4.0. This mix is allowed to autolyse at 20°–50° C for times varying from 3 hours to 14 days. The mix is filtered to remove undissolved fish and the filtrate containing dissolved and suspended solids of between 10 – 25% by weight are concentrated to 45 – 55% solids by weight.

Alternative protein sources for autolysis could be used such as chicken offal, bovine offal, porcine offal, or any raw meat source. If autolysis is slow proteolytic enzymes such as papain or pepsin may be used.

If an autolysate is to be used immediately it need not be acidified. Moreover, the acid in stabilized fish solubles or a stabilized autolysate may be neutralized either by the addition of suitable alkali or by the buffering effect of other components in the food formulation, leading to a final product having a pH in the higher range, for example between 5.5 and 7.

The preferred concentration of aqueous polypeptide material in the mix is at least 15% and preferably 20 – 40% by weight of the mix as formulated. The product may be cooked especially when heat-coagulable binders are included, and the concentration of polypeptide solids after cooling will not necessarily be the same as in the mix as initially formulated. The preferred concentration of low molecular weight polypeptide solids in the final product is 5–30%, and more especially 10–20%. The product may also contain conventional humectants such as sugars, glycols or glycerol, but at lower levels than would be required in the absence of the polypeptide material.

Fat may be included, in which case an antioxidant such as butylated hydroxyanisole will be desirable. Vitamins and minerals may be added to give a nutritionally balanced diet. Colouring agents and antimycotics may also be added.

If a solid, coherent product is required, it is preferred to use a coagulable binder comprising gluten or soluble meat proteins but a binding function can also be supplied by a variety of other coagulable materials, e.g. protein extracts, egg albumen or starch. The bound product can be formed into a variety of shapes and sizes, for example by extrusion or moulding or by cutting a formed slab. The binder may be coagulated by heat, using conventional cooking techniques such as baking, frying or microwave cooking.

The proportions of various ingredients used in the product are not critical, subject to the requirements for reduced water activity and, where applicable, pH value and coherence. In general, however, the preferred products will contain from 25 to 70% by weight solid foodstuff including proteinaceous material, from 5 to 30% low molecular weight polypeptide solids, from 0 to 25% other water soluble substances or humectants — and desirably not more than 10% where the pH of the product is less than 5.5 — and from 0 to 30% of heat-coagulable binder solids.

The product may also optionally contain carbohydrate, for example of cereal origin, preferably in one amount not exceeding 35%. Among proteinaceous materials, fish or meat meal may be included at levels up to 30% and raw or moist meaty materials which are capable of supporting bacterial growth (including offals, fish and poultry) at levels up to 60% by weight.

The preferred product is prepared using fish or meat metal with a carbohydrate source and binders such as coagulable proteins or polysaccharides. The whole mix together with any desired additives, is mixed with fish solubles or other acidified polypeptide material and then formed into individual pieces which are baked to coagulate the protein and lower the moisture content slightly.

Alternatively, a "burger" type of product can be prepared using comminuted meaty materials, such as meat offals, which may be mixed with the polypeptide material and pasteurized or boiled, whereafter the mixture may be further mixed with fat, nutritional additives and antimycotic and additional protein material in the form of vegetable proteinaceous material such as soya. The hot mixture can be allowed to cool in a layer and subsequently cut to a desired shape and size, or extruded and compacted into desired portions.

In the preferred production procedure a dried protein source, for example fish meal, is mixed intimately with a carbohydrate material, for example cereal flour, a heat-coagulable protein such as gluten, and an antimycotic such as potassium sorbate. A slurry is made of fish solubles or protein autolysate and an emulsion of muscle meat with sodium chloride solution, and this is thoroughly mixed into the dry ingredients with sufficient water to convert the mix into a stiff dough. This is extruded and chopped into discrete pieces which are baked to coagulate the proteins and lower the moisture content.

The following examples illustrate the practice of the invention.

EXAMPLE 1

10 Parts of fish meal were mixed with 10 parts of gluten, 20 parts of English Bakers Flour and 0.6 parts of potassium sorbate. A slurry of 20 parts of beef muscle meat was emulsified with 2% sodium chloride and 30 parts of fish solubles. This was added to the dry ingredients with constant mixing. A further 10 parts of water was added to produce an extrudable dough. This was extruded through holes of 1 cm diameter and chopped off in 1 cm pieces. They were baked in a gas oven at a setting of Regulo 7 (about 165° C) for 10 minutes and allowed to cool. They were packed in "Saran" (Trade Mark) coated polyethylene pouches under nitrogen and heat sealed.

The water activity was 0.87 and the pH 5.0 and the product pieces were readily eaten by cats.

The fish autolysate used in the following example was made by acidifying minced whitefish head and back to pH 4.1 with lactic acid, autolysing at 20° C for 5 days and concentrating the filtered autolysed fish to about 50% by weight solids.

The following examples show the use of fish or meat autolysates in the preparation of food products according to the invention.

EXAMPLE 2

| Fish meal | 10 | parts by weight |
| Muscle meat emulsion | 20 | parts by weight |
| Gluten | 10 | parts by weight |
| Flour | 20 | parts by weight |
| Fish autolysate (49% solids) | 30 | parts by weight |
| Potassium sorbate | 0.6 | parts by weight |
| Butylated hydroxyanisole | 0.01 | parts by weight |
| Water | 9.4 | parts by weights |

The above formulation was made up as described in Example 1. The water activity was 0.88, moisture content 31% and pH 5.0.

EXAMPLE 3

Chicken offal was finely minced while frozen, mixed with 5% by weight lactic acid and held at 45° C for 1 hour. The autolysate was filtered using a 25-mesh (B.S.) sieve and was concentrated to about 55% solids. The autolysate was used in place of fish solubles in the preparation of a food product according to Example 1, the product being cooked for 6 minutes at 165° C. The water activity of the resulting product was 0.90, the moisture content 32% and the pH 4.3. The product was bacteriologically stable.

EXAMPLE 4

| Tripe autolysate | 35.0 | parts by weight |
| Tripe (minced through 2 mm plate) | 28.0 | parts by weight |
| Glycerol | 3.0 | parts by weight |
| Propylene glycol | 3.0 | parts by weight |
| Butylated hydroxyanisole | 0.001 | parts by weight |
| 2% Chocolate Brown HTS solution | 0.48 | parts by weight |
| 2% Red 2GS solution | 0.11 | parts by weight |
| 2% Red 6B solution | 0.08 | parts by weight |
| Skimmed milk powder | 1.7 | parts by weight |
| Dicalcium phosphate | 2.0 | parts by weight |
| Sodium chloride | 1.3 | parts by weight |
| Potassium sorbate | 0.3 | parts by weight |
| Vitamin mix | 0.15 | parts by weight |
| Mineral concentrate | 0.05 | parts by weight |
| Vital wheat gluten | 25.0 | parts by weight |

The tripe autolysate was produced by mincing tripe through a 2mm plate, acidifying with 5% lactic acid and autolysing for 48 hours at 45° C. The autolysate was filtered through a 25-mesh sieve and concentrated. The concentrate had pH of 4.5, an Aw of 0.91 and a total solids of 38%.

The autolysed tripe and minced tripe were mixed together and heated to 95°–100° C for 15 minutes. The loss in weight was made good with water at the end of this period. The propylene glycol, glycerol, butylated hydroxyanisole and dyes were added and mixed in, followed by all the remaining ingredients except for the gluten. The temperature of the mix was allowed to fall to 70° C and then the vital wheat gluten was rapidly mixed in. The dough was rolled into a ¾ inch layer on a tray and cooked at 145° C for 15 minutes. The product was cut into ½-inch to ¾-inch chunks, when cool.

The product was found to have an Aw of 0.91 and a pH of 4.9 and a moisture content of 38%. The chunks were soft and moist with a juicy texture. When heat sealed under nitrogen in a "Saran" laminate plastic pouch the product had an extended shelf life.

EXAMPLE 5

| Sprats | 32.2 | % by weight |
|---|---|---|
| Lactic Acid | 1.7 | % by weight |
| English bakers flour | 28.8 | % by weight |
| Gluten | 11.7 | % by weight |
| Potassium sorbate | 0.49 | % by weight |
| Butylated hydroxyanisole | 0.01 | % by weight |
| Choline chloride | 0.6 | % by weight |
| Sodium chloride | 1.9 | % by weight |
| Fish autolysate | 22.6 | % by weight |

The fish autolysate used had an Aw of 0.89, a total solids of 49% and a pH of 4.5.

The sprats were finely minced and heated to 95°-100° C by indirect steam for 30 minutes. The loss in weight was made good at the end of this period by the addition of water. The heated mixture was allowed to cool to about 50° C and then the remaining ingredients were mixed in. The dough-like mixture was extruded through a 1 cm diameter hole and chopped off in 1 cm pieces. They were baked in an oven at 165° C for 4 minutes. When the product had cooled they were packed in Saran laminate plastic pouches under nitrogen and heat sealed.

The product was found to have a water activity of 0.89, a pH of 4.4, and a moisture content of 34%. Its acceptability to cats was high and it had an extended storage life.

The following is an example of a "burger" type product of low water activity.

EXAMPLE 6

| A : | Sugar | 21.0 | parts by weight |
|---|---|---|---|
|  | Minced tripe | 13.9 | parts by weight |
|  | Fish solubles | 17.0 | parts by weight |
| B : | Beef dripping | 7.5 | parts by weight |
|  | Glycerol monostearate | 0.3 | parts by weight |
|  | Citric acid | 0.2 | parts by weight |
|  | Butylated hydroxyanisole | 0.02 | parts by weight |
|  | Flavouring | 0.5 | parts by weight |
| C : | Soya grits | 22.9 | parts by weight |
|  | Soya flour 50 | 12.6 | parts by weight |
|  | Mineral vitamins | 3.9 | parts by weight |
|  | Potassium sorbate | 0.3 | parts by weight |

Ingredients A were placed in a steam jacketed bowl and boiled with stirring for 10 minutes. Ingredients B were mixed together and added together with incredients C to the jacketed bowl. The whole was mixed for 5 minutes, formed into a layer on a tray and allowed to cool. The product had a moisture content of 19.5% and a water activity of 0.75.

What is claimed is:

1. A packaged moist food composition comprising:
   edible proteinaceous material;
   moisture at a concentration of from 15 to 45% by weight of the composition;
   and sufficient edible water-soluble material to confer bacteriological stability on said composition, said water-soluble material including from 5 to 30% polypeptide solids by weight of said composition, said material being such as confers on a 50% aqueous solution thereof a water activity of less than 0.95, the molecular weight of said polypeptide solids being low enough for water solubility at ambient temperature, thereby to reduce the vapor pressure of the moistening component.

2. A food composition according to claim 1 having a pH value in the range 3.5 to 5.5 and a water activity in the range 0.85 to 0.95.

3. A food composition according to claim 1 having a pH value in the range 5.5 to 7 and a water activity in the range 0.75 to 0.85.

4. A food composition according to claim 1 wherein said polypeptide material is derived from fish solubles.

5. A food composition according to claim 1 wherein said polypeptide material is derived from a fish or meat autolysate.

6. A food composition according to claim 1 additionally containing a coagulated protein binder whereby said composition is bonded into a coherent product of desired shape and size.

7. A packaged moist food composition comprising by weight
   from 25 to 70% solid foodstuffs including proteinaceous material;
   from 5 to 30% degraded animal tissue polypeptide solids adapted to confer on a 50% aqueous solution thereof a water activity of less than 0.95, the molecular weight of said polypeptide solids being low enough for water solubility at ambient temperature, thereby to reduce the vapor pressure of the moistening component;
   from 0 to 30% coagulated binder;
   from 0 to 25% other edible water-soluble substances;
   and from 15 to 45% moisture;
   said polypeptide solids and said other water-soluble substances sufficing to confer on said composition stability against bacterial growth.

8. A method of making a packaged moist food composition which comprises the steps of:
   providing a water soluble low molecular weight polypeptide material capable of reducing the water activity of a 50% aqueous solution thereof to less than 0.95, the molecular weight of said polypeptide solids being low enough for water solubility at ambient temperature, thereby to reduce the vapor pressure of the moistening component;
   forming a mixture of edible proteinaceous materials and water-soluble substances including from 5 to 30% of said low molecular weight polypeptide material and water in an amount of from 15 to 45% by weight of said mixture;
   and forming said mixture into pieces of desired shape and size and packaging said moist food composition.

9. A method according to claim 8 including the steps of:
   includng in said mix a heat coagulable binder;
   and heating said composition to bind it into a coherent mass.

10. A method according to claim 8 wherein said edible proteinaceous materials include meaty materials capable of supporting bacterial growth, and including the step of:
    heating said mix to at least pasteurize said meaty materials.

11. A method according to claim 8 including the additional steps of:
    preparing from a raw protein material an aqueous solution of low molecular weight polypeptides;
    acidifying said solution;
    and utilizing said acidified solution as the source of said low molecular weight polypeptide material.

12. A method according to claim 8 wherein said acidified solution constitutes from 15 to 40% of said mix.

* * * * *